(12) United States Patent
Long

(10) Patent No.: US 11,772,420 B2
(45) Date of Patent: Oct. 3, 2023

(54) CASTER WHEEL BRAKE AND ANTI-SWIVEL SYSTEM

(71) Applicant: Pipp Mobile Storage Systems, Inc., Walker, MI (US)

(72) Inventor: Matthew M. Long, Lakemoor, IL (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 0 days.

(21) Appl. No.: 17/699,914

(22) Filed: Mar. 21, 2022

(65) Prior Publication Data

US 2022/0297475 A1 Sep. 22, 2022

Related U.S. Application Data

(60) Provisional application No. 63/163,391, filed on Mar. 19, 2021.

(51) Int. Cl.
  *B60B 33/00* (2006.01)
  *B60B 33/02* (2006.01)

(52) U.S. Cl.
  CPC ........ *B60B 33/021* (2013.01); *B60B 33/0049* (2013.01); *B60B 33/0057* (2013.01); *B60B 33/0068* (2013.01); *B60B 33/025* (2013.01)

(58) Field of Classification Search
  CPC . Y10T 16/195; Y10T 16/196; B60B 33/0028; B60B 33/0055; B60B 33/0094;
  (Continued)

(56) References Cited

U.S. PATENT DOCUMENTS 2,262,433 A * 11/1941 Uecker ................. B60B 33/021
  188/68
2,709,828 A * 6/1955 Noelting ............... B60B 33/021
  16/35 R (Continued)

FOREIGN PATENT DOCUMENTS

DE   19516586 A1 * 11/1996 ......... B60B 33/0039
DE  102010051099  11/2011
(Continued)

*Primary Examiner* — Chuck Y Mah
(74) *Attorney, Agent, or Firm* — Gardner, Linn, Burkhart & Ondersma LLP

(57) ABSTRACT

A caster wheel brake and anti-swivel system for carts and other wheeled articles is operable to secure free-castering wheels against swiveling rotation about their swivel axes, and against rolling rotation along their horizontal rotation axes. The system includes a swiveling caster wheel assembly and an actuation link, with an anti-swivel actuator and a brake actuator coupled thereto. Linear movement of the actuation link causes the anti-swivel actuator to engage the anti-swivel member that rotates with the caster wheel about the swivel axis, to selectively prevent the anti-swivel member and wheel from swiveling. The actuation link's movement also urges a brake actuator to move a wheel brake and drives a braking surface into engagement with the wheel, thereby preventing the wheel from rolling at the same time it is prevented from swiveling by the pawl. Optionally, a foot-operated torque shaft and a rack-and-pinion arrangement are used to operate the actuation link.

20 Claims, 10 Drawing Sheets

(58) Field of Classification Search
CPC ............ B60B 33/0039; B60B 33/0049; B60B 33/0057; B60B 33/0068; B60B 33/0081; B60B 33/0084; B60B 33/0092; B60B 33/025; B60B 33/021; B60B 33/023; B60B 33/0042; B60B 33/0073; B60B 33/0078; B60B 33/0086; B60B 37/10; B60B 2200/222; B60B 2200/242; B60B 2900/531; A61G 7/0528; F16D 49/00; F16D 65/42; F16D 2121/14; F16D 2125/32

See application file for complete search history.

(56) References Cited

U.S. PATENT DOCUMENTS

| | | | | |
|---|---|---|---|---|
| 3,409,105 | A * | 11/1968 | Clinton | B60B 33/021 188/29 |
| 3,571,842 | A * | 3/1971 | Fricke | B60B 33/021 16/35 R |
| 3,828,392 | A * | 8/1974 | Bolger | B60B 33/02 16/35 R |
| 3,840,242 | A | 10/1974 | Craig, Sr. et al. | |
| 3,881,216 | A * | 5/1975 | Fontana | B60B 33/021 188/31 |
| 3,911,525 | A * | 10/1975 | Haussels | B60B 33/021 16/35 R |
| 4,205,413 | A * | 6/1980 | Collignon | A61G 1/0243 16/35 D |
| 4,248,445 | A * | 2/1981 | Vassar | B60B 33/021 16/35 R |
| 5,139,116 | A | 8/1992 | Screen | |
| 5,170,529 | A * | 12/1992 | Kovacs | B60B 33/025 16/35 R |
| 6,219,881 | B1 * | 4/2001 | Wen | B60B 33/0018 16/35 R |
| 6,237,725 | B1 | 5/2001 | Otterson et al. | |
| 6,662,404 | B1 | 12/2003 | Stroh et al. | |
| 7,011,317 | B1 | 3/2006 | Hicks et al. | |
| 7,213,816 | B2 | 5/2007 | Gregory et al. | |
| 7,320,472 | B2 | 1/2008 | Gregory et al. | |
| 7,406,989 | B1 | 8/2008 | Casaus | |
| 8,397,345 | B2 | 3/2013 | Von Bordelius et al. | |
| 8,484,802 | B1 * | 7/2013 | Lin | B60B 33/0086 16/35 R |
| 8,516,656 | B2 * | 8/2013 | Lin | B60B 33/0081 188/29 |
| 8,973,217 | B2 | 3/2015 | Weichbrodt | |
| 11,324,648 | B2 * | 5/2022 | Van Loon | A61G 1/0287 |
| 2004/0041462 | A1 | 3/2004 | Hicks | |
| 2006/0131110 | A1 * | 6/2006 | Chung | B60B 33/0073 188/29 |
| 2007/0216117 | A1 * | 9/2007 | Figel | A61G 1/0225 280/47.38 |
| 2008/0120810 | A1 * | 5/2008 | Reckelhoff | A61G 13/0009 5/602 |
| 2011/0107554 | A1 * | 5/2011 | Minowa | B60B 33/0057 16/45 |
| 2011/0119864 | A1 * | 5/2011 | Minowa | B60B 33/0068 16/45 |
| 2013/0111664 | A1 * | 5/2013 | Childs | A61G 7/0528 280/80.1 |
| 2015/0210114 | A1 * | 7/2015 | Spektor | B62B 3/00 16/35 R |
| 2019/0358998 | A1 * | 11/2019 | Patmore | F16D 65/42 |
| 2022/0371640 | A1 | 11/2022 | Long | |

FOREIGN PATENT DOCUMENTS

| | | | |
|---|---|---|---|
| DE | 202013010367 | | 2/2015 |
| DE | 202013009346 | | 3/2015 |
| DE | 102013110134 | | 4/2015 |
| DE | 202014003033 | | 9/2015 |
| DE | 202016100180 | | 4/2016 |
| DE | 202015107054 | | 6/2016 |
| DE | 202016103086 | | 9/2016 |
| DE | 202015103436 | | 11/2016 |
| DE | 202016103756 | | 11/2016 |
| DE | 202016106442 | | 1/2017 |
| DE | 102019123213 B3 * | | 12/2020 |
| EP | 2669143 | | 5/2013 |
| ES | 2588163 | | 10/2016 |
| JP | 11227407 A * | | 8/1999 |
| JP | 2000052704 A * | | 2/2000 |
| JP | 2002264604 A * | | 9/2002 |

\* cited by examiner

CASTER WHEEL BRAKE AND ANTI-SWIVEL SYSTEM

CROSS REFERENCE TO RELATED APPLICATION

The present application claims priority of U.S. provisional application Ser. No. 63/163,391 filed Mar. 19, 2021, which is hereby incorporated herein by reference in its entirety.

FIELD OF INVENTION

This invention relates in general to wheel brake systems for carts and the like.

BACKGROUND OF THE INVENTION

Casters are used to support and move various equipment or structures that broadly include any implement on at least one wheel that is typically moved by manual force, such as a push cart, a wheelchair, or a wheeled bed frame. Casters can include one or more wheels and are employed to facilitate moving a structure to which the casters are mounted or attached. Typical swiveling casters include a central mounting member having an upwardly-extending off-centered stem and an axle-mounted roller or wheel, with the stem laterally offset from the axle so that the roller or wheel will assume a "trailing" position behind the stem when the structure is being moved. Swiveling caster assemblies are often capable of pivoting or swiveling through 360 degrees of motion about an axis of the stem. It may be desirable to prevent the roller or wheel from both rolling and swiveling, such as when the associated cart or structure is positioned on an incline, or when any inadvertent movement of the structure could damage the structure or other objects or surfaces, or create a safety hazard. This is because brakes that permit swiveling can allow the associated structure to move several inches through wheel swiveling movement alone.

SUMMARY OF THE INVENTION

The present invention provides a caster braking and anti-swivel system that can be integrated with one or more wheels of a mobile structure, such as a push cart, a wheel chair, or the like. By simultaneously preventing rolling rotation and swiveling rotation of a swiveling caster wheel, the caster braking and anti-swivel system causes the locked wheel to resist movement of the mobile structure in any direction along a support surface, such as a warehouse floor. This provides enhanced stabilization for the mobile structure when the system is locked, and the system can be readily locked or unlocked with a single motion, such as pressing down on a portion of an actuation lever.

In one form of the present invention, a caster wheel brake and anti-swivel system is provided for push carts or other wheeled structures, and allows a user to easily lock and unlock one or more swiveling caster wheels against both rolling and swiveling movements. The system includes a caster wheel assembly, a wheel brake, an anti-swivel actuator and brake actuator both associated with an actuation link. The caster wheel assembly includes a wheel having a rolling axis and a swiveling axis, and an anti-swivel member that rotates with the wheel about the swivel axis. The actuation link is movable from an unlocking position to a locking position, and moves the anti-swivel actuator and the brake actuator in a corresponding manner. Movement of the actuation link from the unlocking position to the locking position urges the anti-swivel actuator into engagement with the anti-swivel member to lock the wheel against swiveling about the swivel axis, and to move the brake actuator to the braking position to lock the wheel against rotation about the rolling axis.

According to one aspect, a foot-operated torque shaft and a rack-and-pinion arrangement are used to operate the actuation link.

According to another aspect, the brake actuator is a cam having a ramped surface and a horizontal surface at a lower end of the ramped surface. Engagement of the wheel brake with the horizontal cam surface corresponds to the braking position.

In yet another aspect, the wheel brake is an actuatable plunger that is aligned with and linearly movable along the swivel axis. The wheel brake has a brake surface for impinging against a resilient tire surface of the wheel.

In a further aspect, the system includes a torque shaft that is operable to move the actuation link between the locking and unlocking positions. Optionally, a foot-operated lever is coupled to the torque shaft for operating the torque shaft.

According to still another aspect, a gear rack is positioned along the actuation link and a pinion gear is coupled to the torque shaft and intermeshed with the gear rack. The torque shaft and the pinion gear are rotatable together to move the actuation link linearly between the locking and unlocking positions.

Accordingly, the caster braking and anti-swivel system of the present invention allows an operator to secure swiveling caster wheels against both rotation and swiveling in a single motion of a single lever or other form of actuator. This minimizes any movement of a cart or other mobile structure when its parking brake is set. The system can be operated to simultaneously secure multiple wheels of a mobile structure to provide enhanced stabilization when the mobile structure is parked, yet the system is easily disengaged by an operator in a single motion.

These and other objects, advantages, purposes and features of the present invention will become apparent upon review of the following specification in conjunction with the drawings.

DETAILED DESCRIPTION OF PREFERRED EMBODIMENTS

Figure 1:
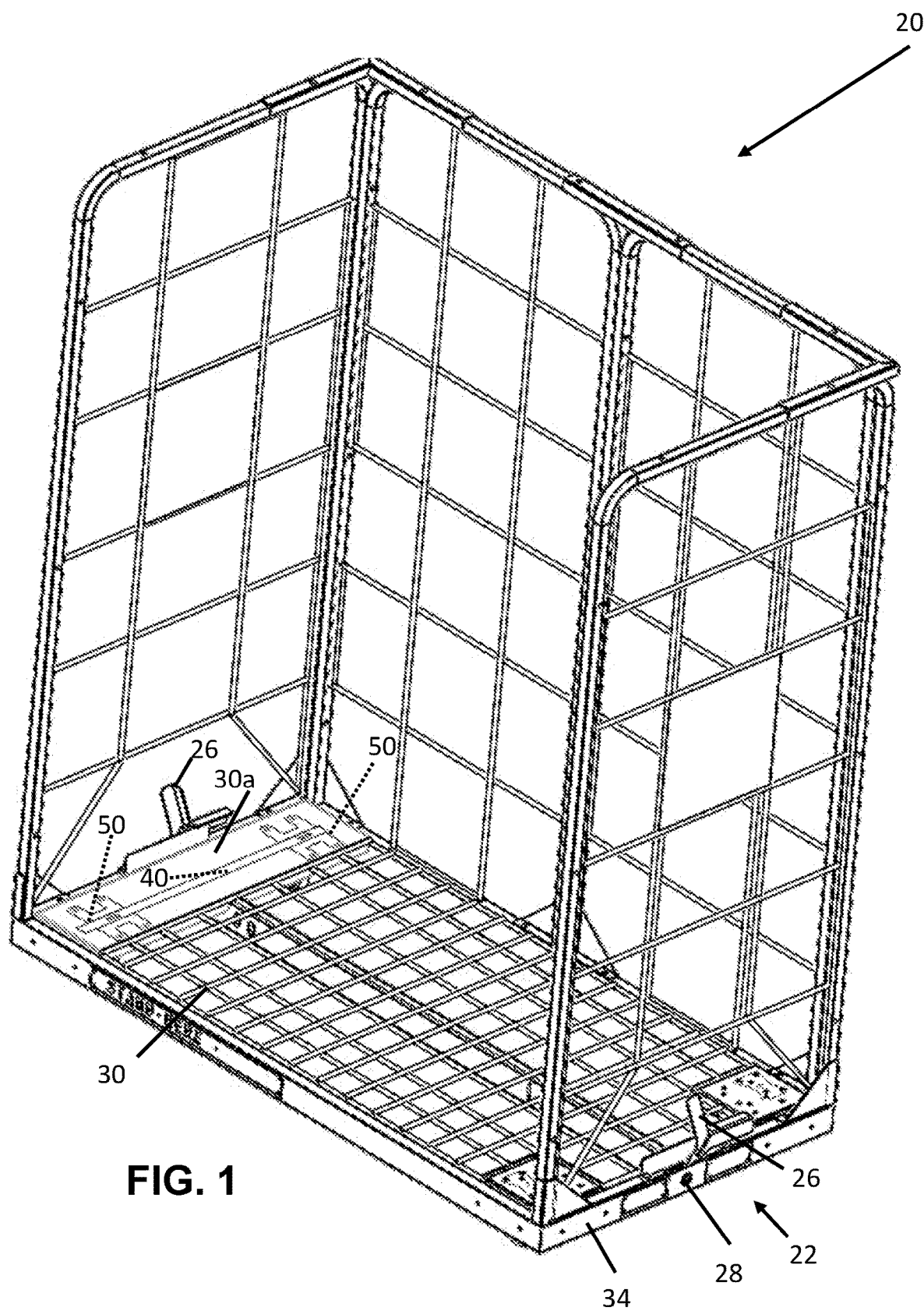
FIG. 1 is a top perspective view of a cart fitted with a caster wheel brake and anti-swivel system in accordance with the present invention.
Figure 2:
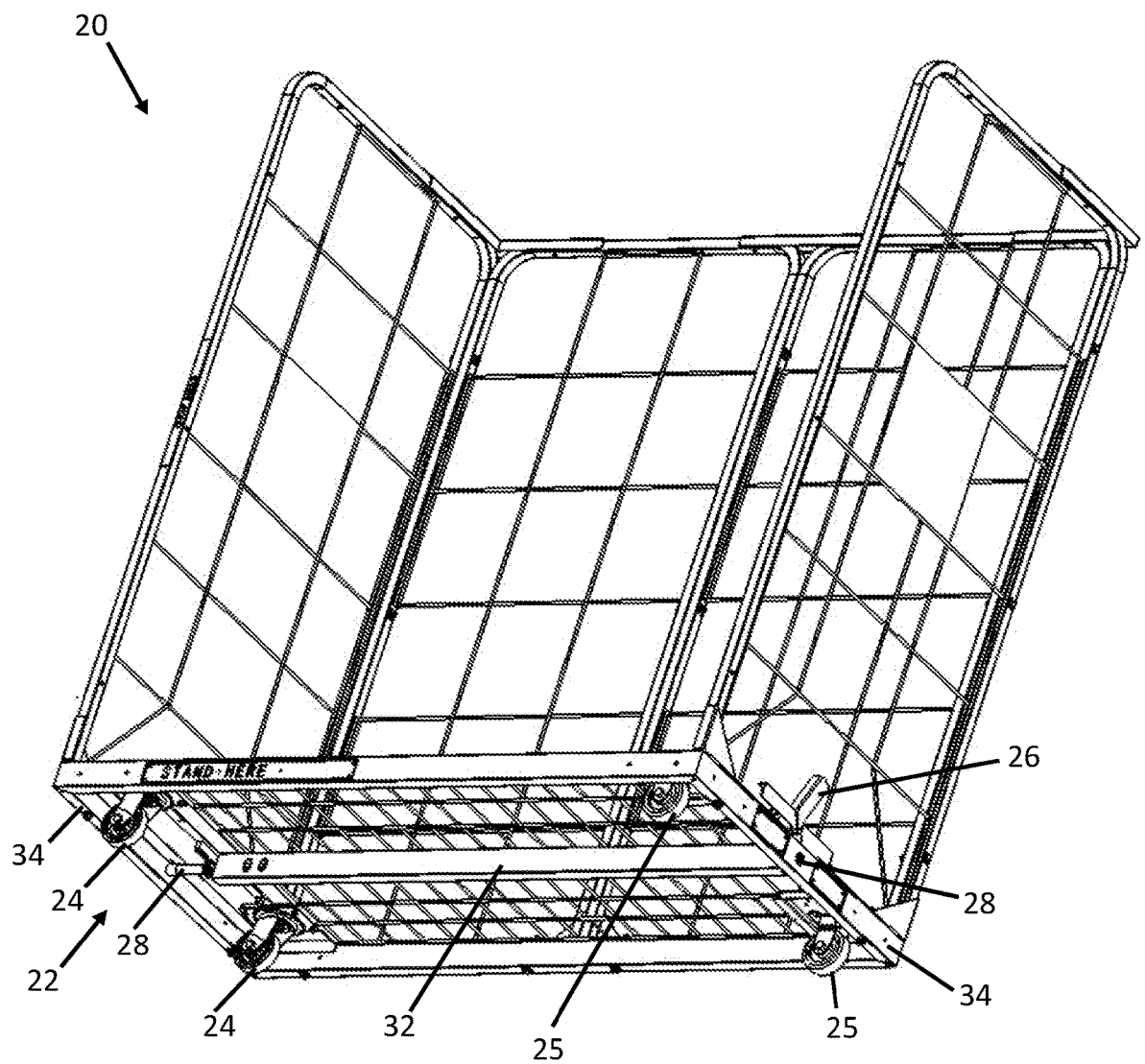
FIG. 2 is a bottom perspective view of the cart with caster wheel brake and anti-swivel system of FIG. 1.
Figure 3:
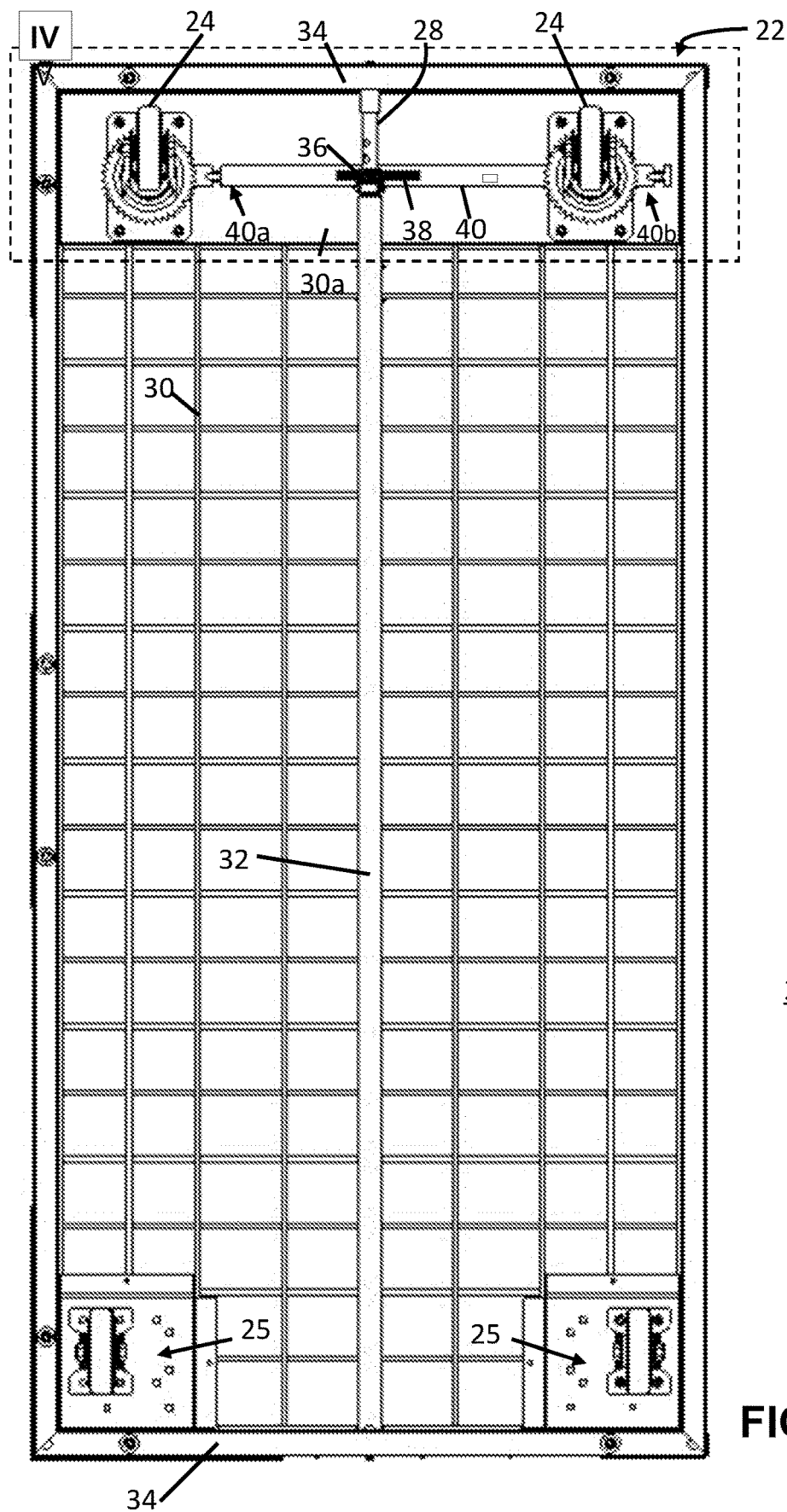
FIG. 3 is a bottom plan view of the cart with caster wheel brake and anti-swivel system.
Figure 4:
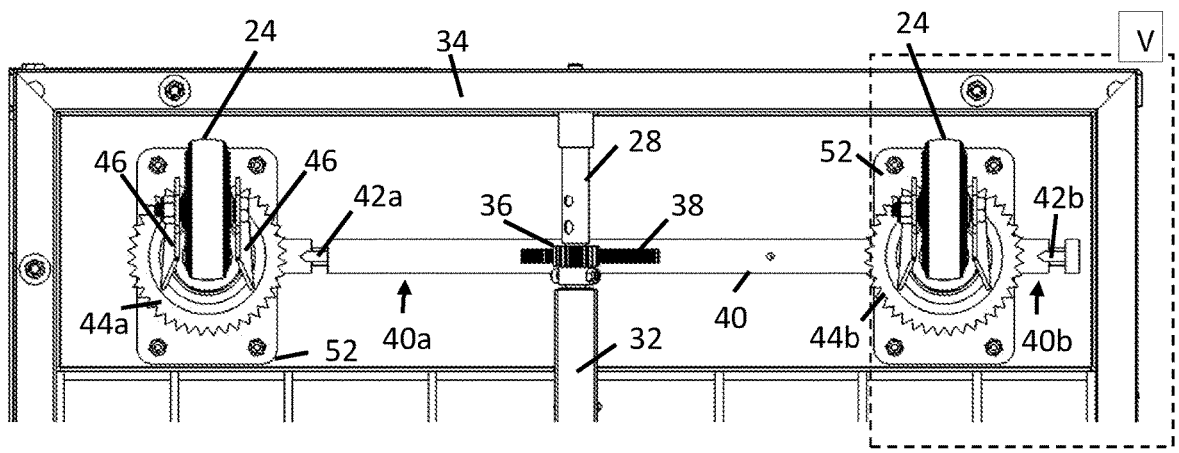
FIG. 4 is an enlarged view of the area designated IV in FIG. 3.

Referring now to the drawings and the illustrative embodiments, in particular FIGS. 1-3, a push cart 20 is provided with a caster wheel brake and anti-swivel system 22 that allows a user to selectively lock and unlock a pair of swiveling caster wheels 24 against rolling motion and against swiveling motion, as will be described in more detail below. A pair of non-swiveling caster wheels 25 support an opposite end of push cart 20, which is representative of substantially any mobile support or storage device that is used to support articles for transport, typically within a facility such as a warehouse, a factory, a retail store, or the like. Push cart 20 is manually movable by an individual operator, although in some cases a push cart may be self-powered and controlled by the operator. By selectively locking and unlocking wheels 24 against both rolling motion and against swiveling motion, caster wheel brake and anti-swivel system 22 provides improved resistance to undesired movements of cart 20. When swiveling caster wheels 24 are secured in this manner, they cannot rotate about their horizontal axles, and they cannot swivel about their vertical mounting posts, unlike more traditional brakes that only prevent wheel rotation but still permit swiveling of a swiveling caster.

Caster wheel brake and anti-swivel system 22 includes a foot-actuatable lever 26 at each end of cart 20, as shown in FIGS. 1, 2, 6 and 7. Lever 26 rotates a torque shaft 28 that runs along a longitudinal axis of cart 20 beneath a lower support panel 30 thereof. Most of torque shaft 28 is contained within an elongate tubular housing 32 having a rectangular cross section (FIGS. 2-4 and 7-9), with opposite ends of the torque shaft 28 received in openings formed in respective bottom frame end pieces 34 of cart 20. In the illustrated embodiment, lever 26 is V-shaped with an angle greater than 90° between its upper legs 26a, so that lever 26 pivots less than 90° from limit-to-limit. A downwardly-extending leg 26b (FIGS. 6 and 12) enters each bottom frame end piece 34 and defines a slot or opening 27 that receives a correspondingly-shaped tip 29 at a respective end of the torque shaft 28 (FIG. 12) so that torque shaft 28 rotates with lever 26.

Optionally, a gear or chain-drive system (not shown) may be used to indirectly connect lever 26 to torque shaft 28 so that the torque shaft 28 rotates at a greater rate than lever 26. For example, torque shaft 28 may rotate two degrees for every degree that lever 26 rotates. The connection linking lever 26 to torque shaft 28 may be configured to cause the torque shaft 28 to rotate by the same amount as lever 26, or by a lesser or greater degree as desired, to achieve the desired rotation of torque shaft 28. It will be appreciated that other forms of actuators may be used to rotate torque shaft 28, such as a hand-operated lever or crank positioned at a more elevated location along the cart 20.

Figure 8:
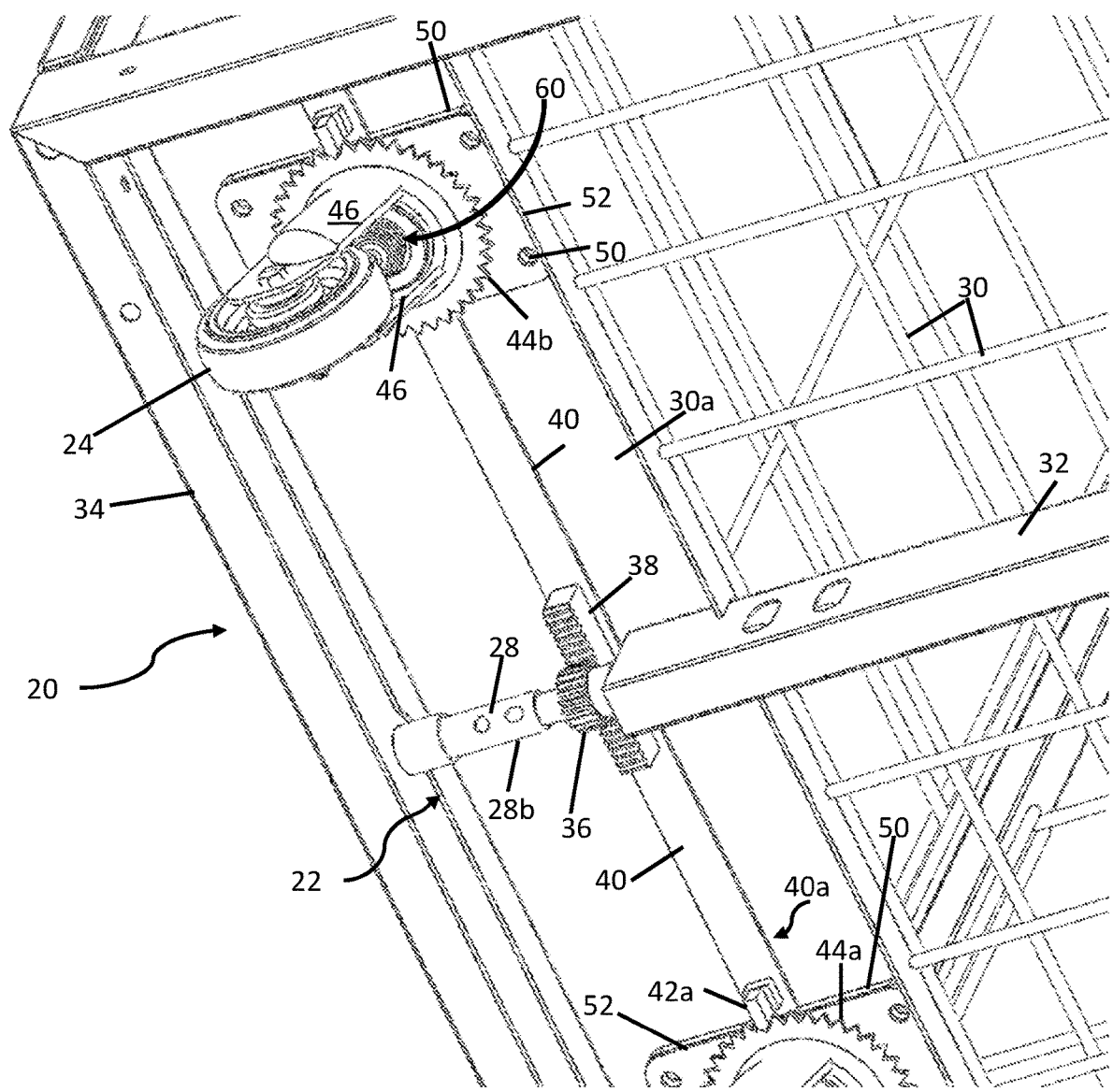
FIG. 8 is an enlarged bottom perspective view of a portion of the cart including a caster wheel and a portion of the brake and anti-swivel system.
Figure 9:
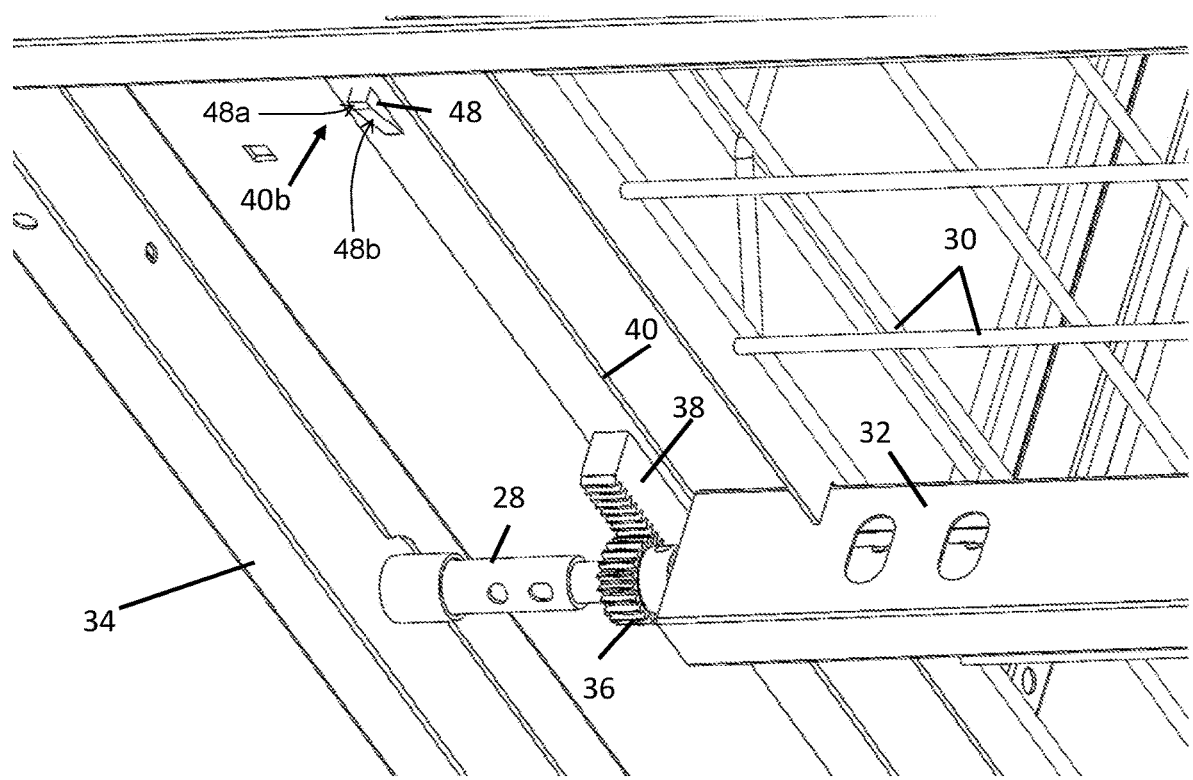
FIG. 9 is another enlarged bottom perspective view of a portion of the cart and system of FIG. 8, with the caster wheel omitted to show a brake actuator cam of the brake and anti-swivel system.
Figure 10:
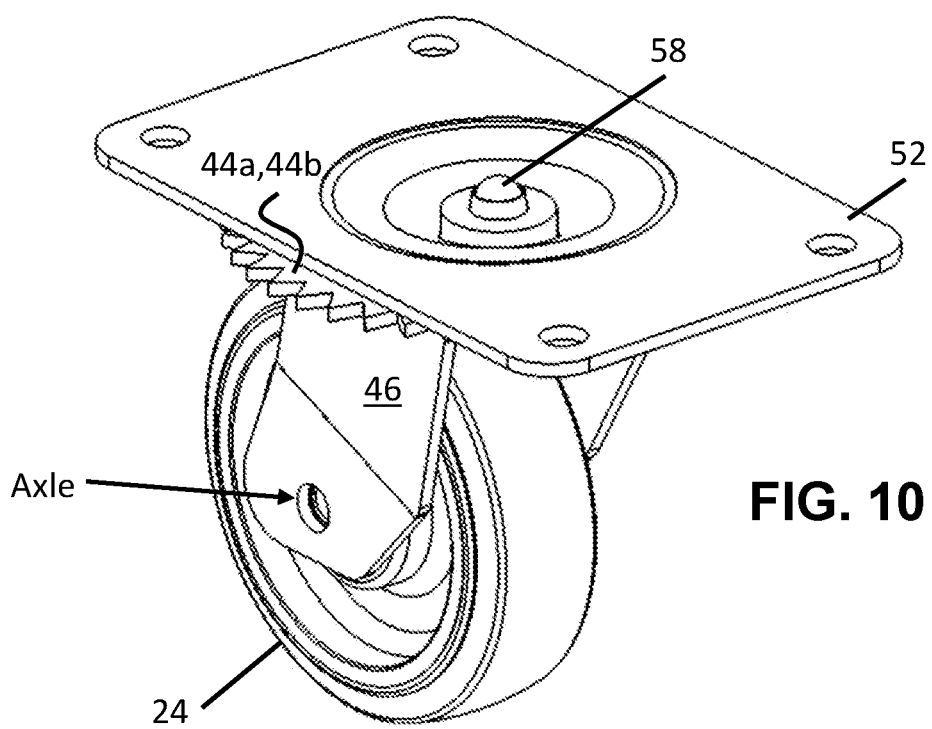
FIG. 10 is a top perspective view of a caster wheel assembly of the caster wheel brake and anti-swivel system.
Figure 11:
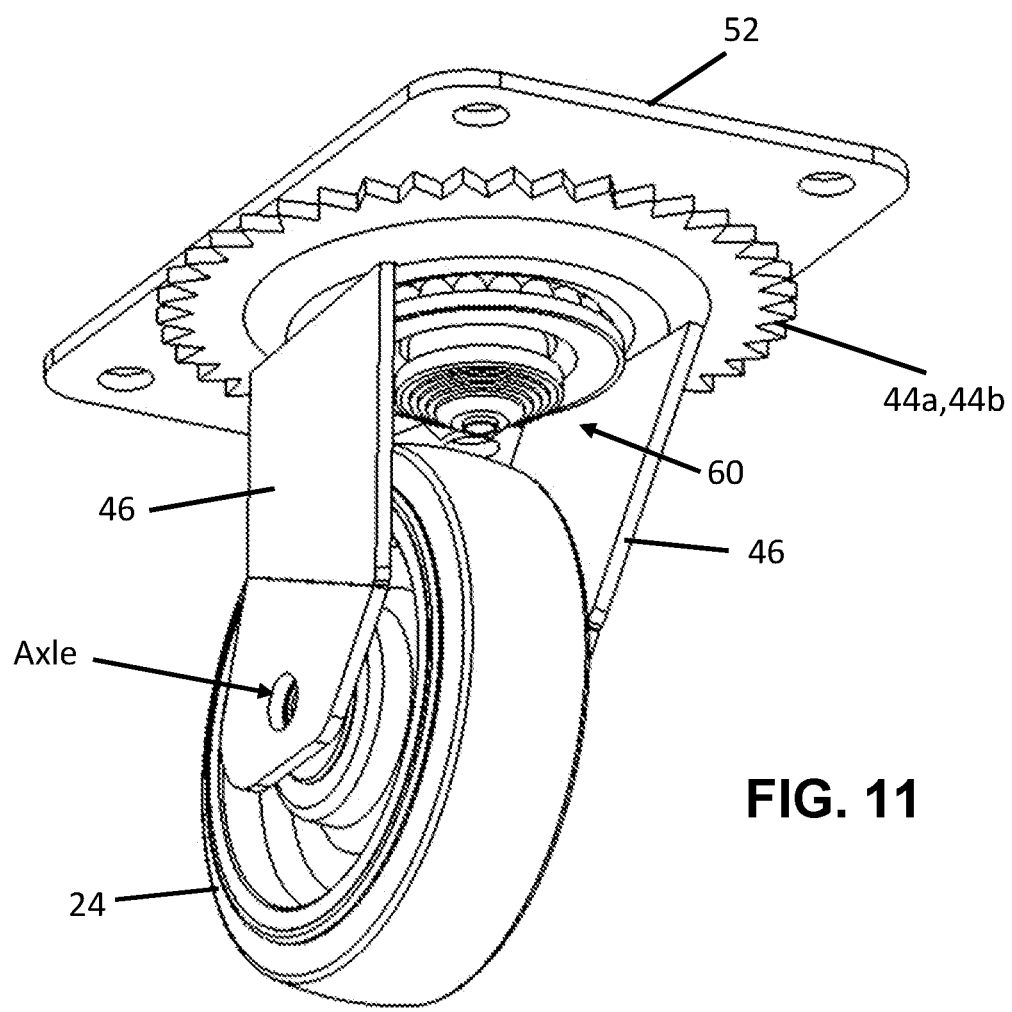
FIG. 11 is a bottom perspective view of the caster wheel assembly of FIG. 10.
Figure 12:
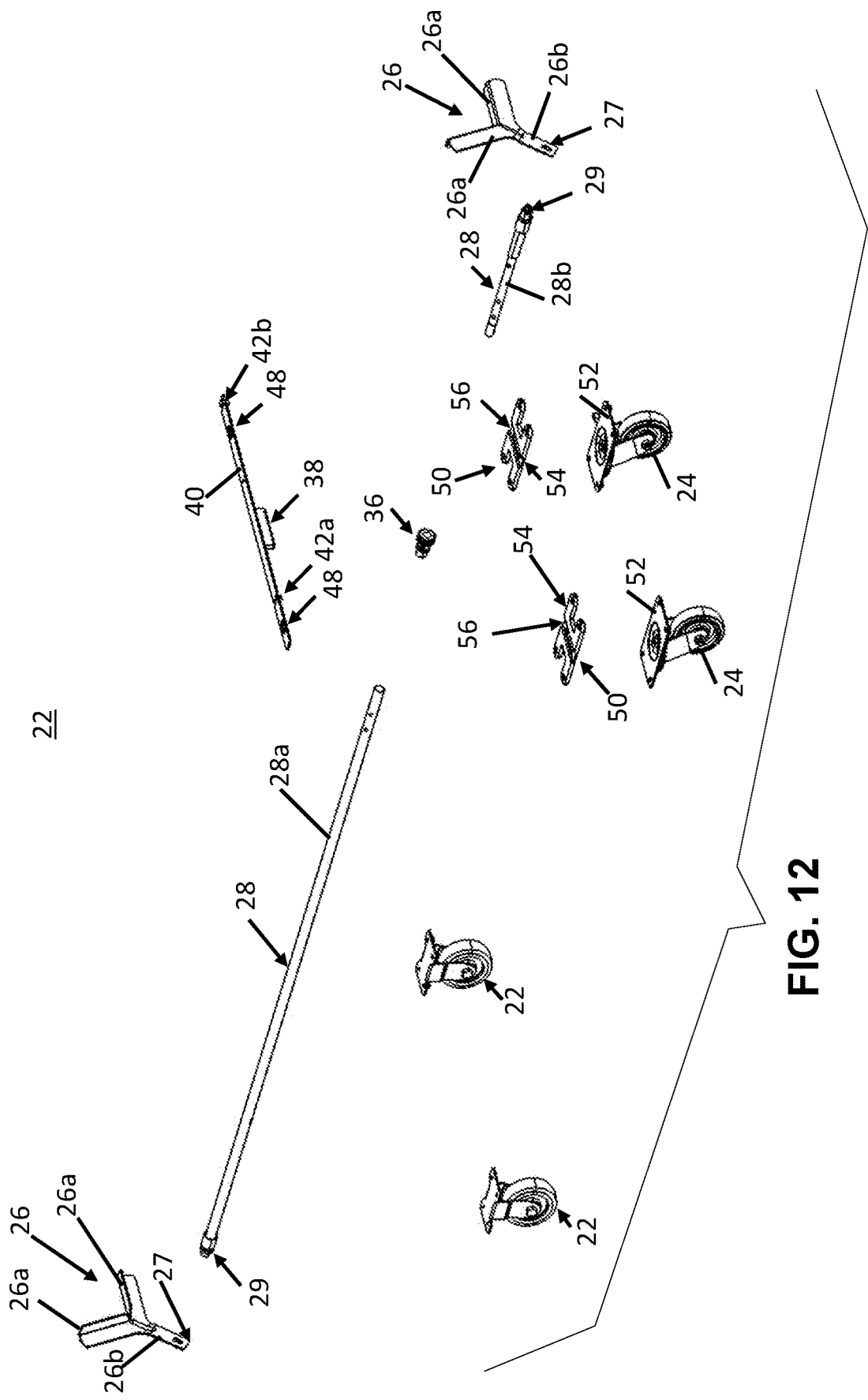
FIG. 12 is an exploded top perspective view of the caster wheel brake and anti-swivel system.

Referring to FIGS. 8, 9, and 12, torque shaft 28 it is fitted with a pinion gear 36 where the shaft passes between caster wheels 24. In the illustrated embodiment, torque shaft 28 is a two-piece structure including a main tubular shaft 28a and a shaft end portion 28b that is received in the main tubular shaft 28a in a telescoping manner. The main shaft 28a and shaft end portion 28b may be secured together using fasteners, welding, or other suitable means. The two-piece torque shaft 28 allows the finished shaft to be more readily sized according to different sizes of carts, such as by providing different lengths of end portions 28b, or by designing the end portion 28b to be inserted to different distances into the main shaft 28a before securing. The two-piece torque shaft 28 also facilitates installation of pinion gear 36, which can be slid onto a narrower-diameter region of the shaft end portion 28b and secured there before the narrower-diameter shaft end portion 28b is inserted into the main tubular shaft 28a.

Figure 5:
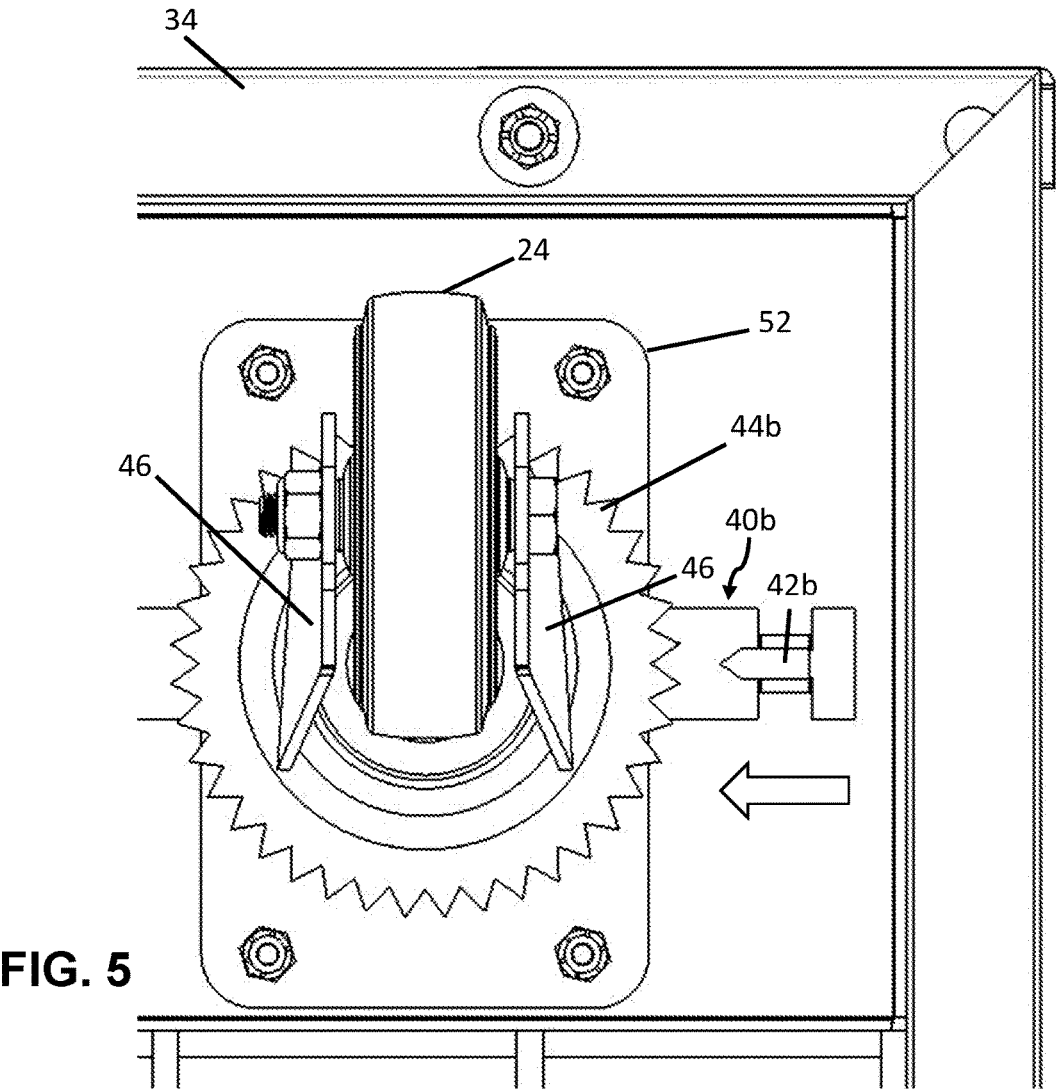
FIG. 5 is an enlarged view of the area designated V in FIG. 4.
Figure 6:
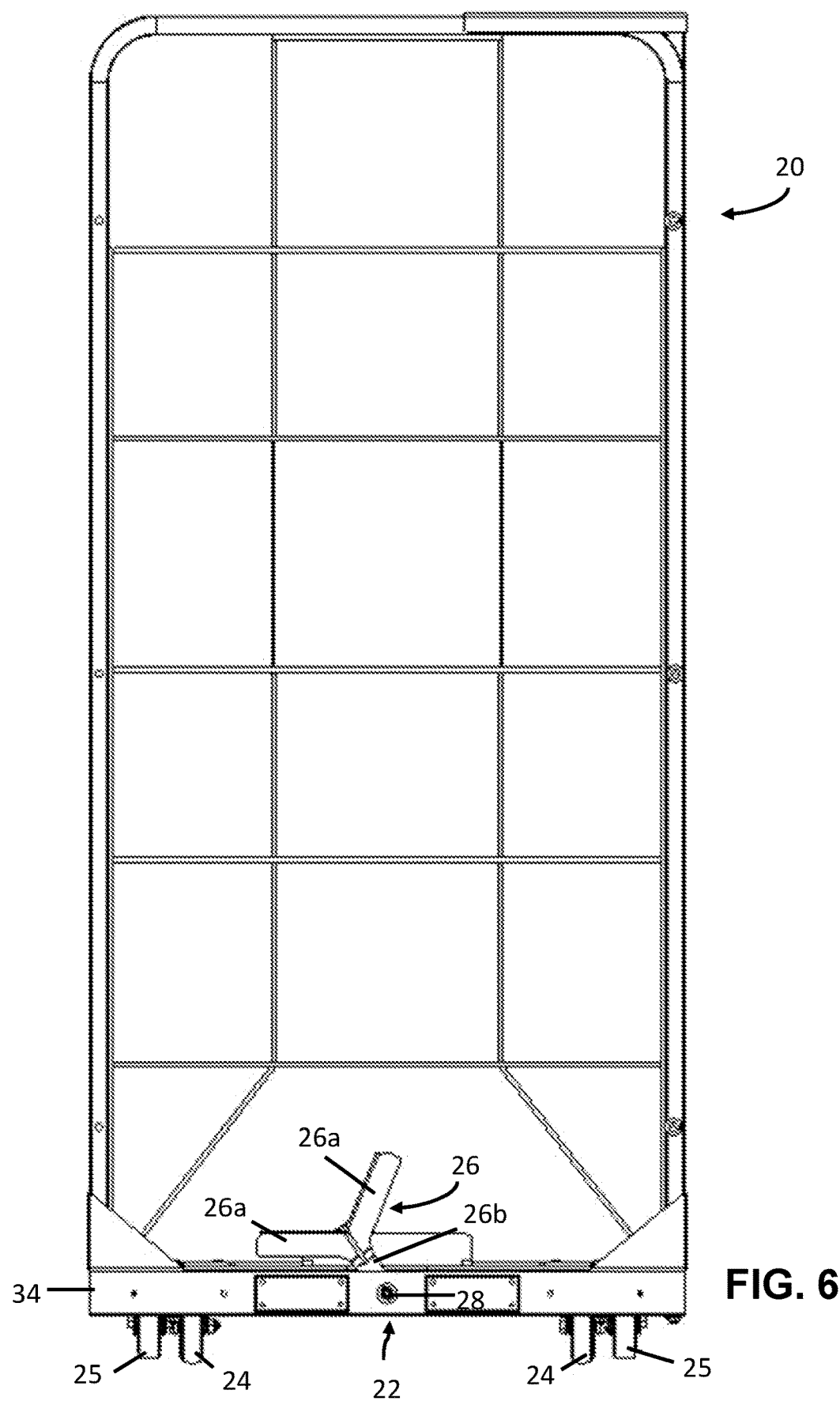
FIG. 6 is an end elevation view of the cart with caster wheel brake and anti-swivel system.
Figure 7:
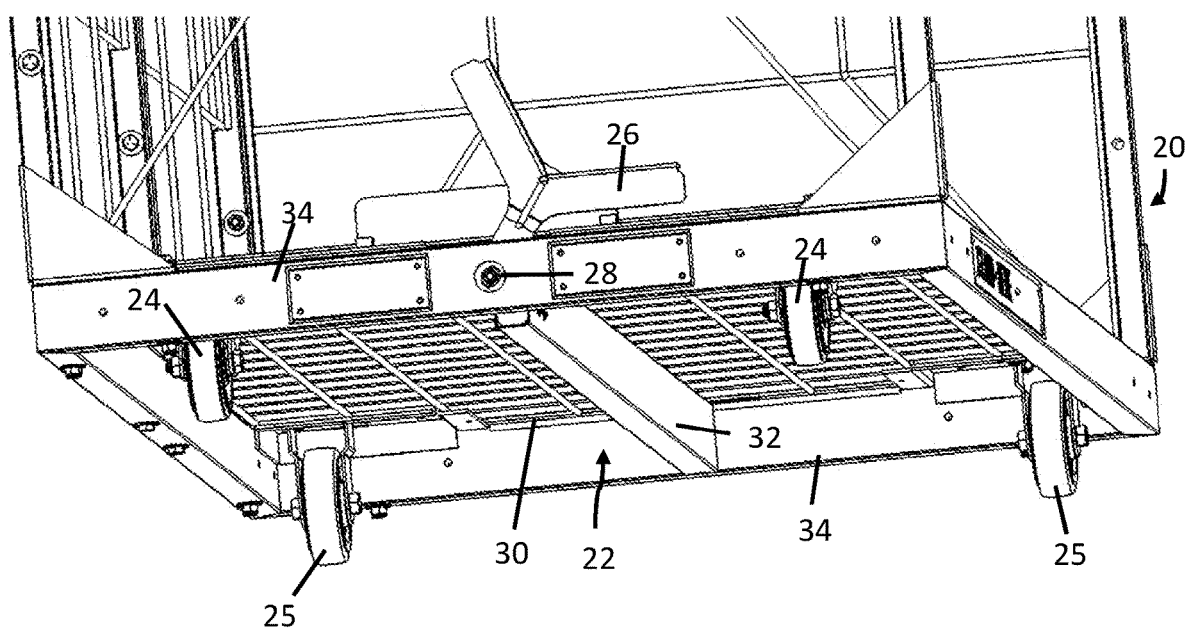
FIG. 7 is an enlarged bottom perspective view of a lower region of the cart with caster wheel brake and anti-swivel system.

Pinion gear 36 rotates with shaft 28 to drive an actuation rack 38 having a plurality of teeth that intermesh with pinion gear 36, such as shown in FIGS. 3, 4, 8, and 9. Actuation rack 38 is coupled to an underside of an actuation link 40 that is slidably mounted to an underside of cart 20 at an end portion 30a of lower support panel 30, between caster wheels 24. Actuation link 40 has a pair of opposite ends 40a, 40b that are fitted with respective anti-swivel actuators in the form of pawls 42a, 42b, which are configured to selectively engage and disengage respective anti-swivel members such as toothed gears 44a, 44b that are associated with respective caster wheels 24. When foot-actuatable lever 26 is moved from the unlocked position (shown) to the locked position, pinion gear 36 rotates with torque shaft 28 to drive actuation link 40 in a linear manner, to the left as viewed in FIGS. 4 and 5 (and indicated with an arrow in FIG. 5), so that both pawls 42a, 42b engage the respective anti-swivel gears 44a, 44b. It will be appreciated that other types of anti-swivel members may be envisioned, without departing from the spirit and scope of the present invention. For example, the anti-swivel feature may be provided by wheels having a resilient outer surface that can be impinged by pawls 42a, 42b, or that may be engaged by brake pads in place of pawls, or the anti-swivel feature may be provided by a rigid wheel surface that can be engaged by brake pads in place of (or fitted to) pawls 42a, 42b. Optionally, multiple pinion gears 36 may be positioned in linear spaced arrangement along the torque shaft 28, with corresponding actuation link 40 and associated actuators, which can be aligned with different sets of wheels 24 to provide simultaneous braking for multiple sets of caster wheels. It will be appreciated that even non-swiveling caster wheels can be braked using the brake actuator portion of the system, such that both swiveling and non-swiveling caster wheels of the same cart may be secured against rotation, and also against swiveling for the swiveling caster wheels.

The engagement of pawls 42a, 42b with anti-swivel gears 44a, 44b prevents swiveling rotation of the caster wheels 24 about their vertical axes, because wheels 24 are mounted on axles that are coupled to anti-swivel gears 44a, 44b by a pair of legs 46 (FIGS. 4, 5, 8, 10, and 11). To prevent wheel rotation, a pair of brake actuator cams or ramps 48 (FIG. 9) extend downwardly from actuation link 40, directly above each caster wheel 24. At the same time that pawls 42a, 42b engage anti-swivel gears 44a, 44b to prevent swiveling, brake actuator cams or ramps 48 are moved laterally with the actuation link 40 to engage respective wheel brakes, in the form of brake plungers 58, to prevent rotation of the wheels 24 in a manner that will be described in more detail below.

Referring to FIGS. 8 and 12, actuation link 40 is supported by a pair of brackets 50 that are sandwiched between wheel mounting plates 52 of caster wheels 24, and an underside of the lower support panel's end portion 30a. Each bracket 50 defines a channel 54 (FIG. 12) along its upper surface so that actuation link 40 can be slidingly received by the brackets 50. A rectangular opening 56 is formed at the center of each bracket 50, and is open to the channel 54. Rectangular openings 56 receive the respective brake actuator cams 48 that extend downwardly from the actuation link 40, thus allowing the brake actuator cams 48 to slidingly engage upper ends of brake plungers 58 (FIG. 10) that are mounted along the wheels' vertical swivel axes. Accordingly, when actuation link 40 is slid to the locking position in which pawls 42a, 42b engage the anti-swivel gears 44a, 44b to prevent swiveling of the wheels 24, the brake actuator cams 48 push downwardly on the respective brake plungers 58, which in turn biases brake surfaces 60 (FIG. 11) into engagement with an outer tread surface of each wheel 24 to lock the wheels against rotation about their horizontal rotation axes.

As can be seen in FIG. 9, brake actuator cams 48 have horizontal lower end portions 48a at the lower ends of their ramped surfaces 48b. When brake lever 26 and actuation link 40 are moved fully to the braking position, horizontal lower end portions 48a of brake actuator cams 48 are placed into contact with the upper ends of the respective brake plungers 58. Because the force required to maintain each brake plunger 58 in the braking position against its respective wheel 24 is maintained at the horizontal lower end portions 48a, there is no lateral force component urging the actuation link 40 away from the braking position. Therefore, once the brake lever 26 is moved fully to the braking position, the caster wheel brake and anti-swivel system 22 will maintain its braking position until an external force is applied to brake lever 26 in the direction of the non-braking position. Once this motion is initiated, the brake actuator cams 48 are moved so that the upper ends of the brake plungers 58 slide off of the horizontal lower end portions 48a of the brake actuator cams 48 and then slide along the cams' ramped surfaces 48b. In this way, upward forces that are urging brake plungers 58 toward actuator cams 48 (due to resilient tire material that has been compressed by brake surfaces 60 at lower ends of the brake plungers 58 and/or from optional spring biasing members acting on brake plungers 58) will tend to urge the actuation link 40, torque shaft 28, and lever 26 fully toward the non-braking position once such movement has been initiated by a user at the foot-actuatable lever 26.

Optionally, brake actuator cams 48 may include a ridge or small protrusion near where the ramped surface 48b meets the horizontal lower end portion 48a. Such ridges or protrusions would provide a detent effect in which an elevated force must be initially applied to brake lever 26 to move it out of the fully braked position, because the brake plungers 58 must first be moved past the detent protrusions (pressing the brake plungers 58 and brake surfaces 60 further toward wheels 24) before reaching the ramped surfaces 48b of the brake actuator cams 48.

Therefore, upon actuation of either lever 26, wheels 24 are prevented against swiveling rotation by pawls 42a, 42b engaging anti-swivel gears 44a, 44b, and wheels 24 are simultaneously prevented against rolling rotation by engagement of the brake surfaces 60 with the wheels' outer tread surfaces. Optionally, brake plungers 58 are spring-biased away from wheel 24 so that brake surface 60 is urged away from the wheel's tread surface when actuation link 40 is returned to the unlocked position. Thus, moving the foot-actuatable lever 26 to the unlocking position simultaneously frees both of the wheels 24 to swivel about their vertical axes, and to roll about their horizontal rolling axes so that the cart 20 may again be freely moved as desired.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A caster wheel brake and anti-swivel system comprising:
    a caster wheel assembly comprising:
        a wheel having a rolling axis and a swivel axis; and
        an anti-swivel member that rotates with said wheel about said swivel axis;
    a wheel brake;
    an actuation link configured to move linearly relative to said caster wheel assembly from an unlocking position to a locking position;
    a rotational torque shaft coupled to said actuation link and operable to move said actuation link between the locking and unlocking positions;
    an anti-swivel actuator coupled to said actuation link; and
    a brake actuator coupled to said actuation link and configured to selectively urge said wheel brake into a braking position against said wheel;
    wherein said actuation link is linearly movable from the unlocking position to the locking position to urge said anti-swivel actuator into engagement with said anti-swivel member to lock said wheel against swiveling about the swivel axis, and to move said brake actuator to the braking position to lock said wheel against rotation about the rolling axis.

2. The caster wheel brake and anti-swivel system of claim 1, wherein said brake actuator comprises a cam that slides along said wheel brake to move said wheel brake into the braking position in response to linear movement of said actuation link.

3. The caster wheel brake and anti-swivel system of claim 2, wherein said brake actuator cam comprises a ramped surface and a horizontal surface at a lower end of said ramped surface, wherein engagement of said wheel brake with said horizontal surface corresponds to said braking position.

4. The caster wheel brake and anti-swivel system of claim 1, wherein said anti-swivel member comprises a toothed gear and said anti-swivel actuator comprises a pawl.

5. The caster wheel brake and anti-swivel system of claim 1, wherein said wheel brake comprises an actuatable plunger aligned with and linearly movable along said swivel axis, and a brake surface configured to impinge against a resilient tire surface of said wheel.

6. The caster wheel brake and anti-swivel system of claim 1, wherein said anti-swivel actuator is movably mounted and is selectively movable into engagement with said anti-swivel member.

7. The caster wheel brake and anti-swivel system of claim 1, further comprising a gear rack disposed along said actuation link and a pinion gear coupled to said torque shaft and intermeshed with said gear rack, wherein said torque shaft and said pinion gear are rotatable together to move said actuation link linearly between the locking and unlocking positions.

8. The caster wheel brake and anti-swivel system of claim 7, further comprising a foot-actuated lever coupled to said torque shaft, wherein said foot-actuated lever is manually pivotable between braking and non-braking positions corresponding to the locking and unlocking positions of said actuation link.

9. The caster wheel brake and anti-swivel system of claim 1, comprising:
   a pair of said caster wheel assemblies;
   a pair of said anti-swivel actuators in spaced arrangement along said actuation link and configured to selectively engage respective ones of said anti-swivel members in response to movement of said actuation link from the unlocking position to the locking position; and
   a pair of said brake actuators in spaced arrangement along said actuation link and configured to selectively urge said wheel brakes into said braking positions.

10. The caster wheel brake and anti-swivel system of claim 9, further comprising a pair of brackets configured for mounting above said caster wheel assemblies, wherein said brackets define respective channels for slidably receiving portions of said actuation link.

11. A caster wheel brake and anti-swivel system comprising:
   a swiveling caster wheel assembly configured for mounting to a mobile support or storage device, said wheel assembly comprising:
      a wheel configured to rotate about a rolling axis and configured to swivel about a swivel axis that is oblique to the rolling axis;
      an anti-swivel member that rotates with said wheel about said swivel axis; and
      a wheel brake that is selectively movable to urge a brake surface into engagement with said wheel;
   an actuation link configured to be mounted to the mobile support or storage device and linearly movable from an unlocking position to a locking position;
   a rotational torque shaft that is operable to move said actuation link between the locking and unlocking positions;
   an anti-swivel actuator coupled to said actuation link and configured to selectively engage said anti-swivel member; and
   a brake actuator cam coupled to said actuation link and configured to selectively urge said wheel brake into a braking position;
   wherein said actuation link is movable from the unlocking position to the locking position to urge said anti-swivel actuator into engagement with said anti-swivel member to lock said wheel against swiveling about the swivel axis, and to move said brake actuator cam to the braking position to lock said wheel against rotation about the rolling axis.

12. The caster wheel brake and anti-swivel system of claim 11, wherein said anti-swivel member comprises a toothed gear and said anti-swivel actuator comprises a pawl.

13. The caster wheel brake and anti-swivel system of claim 11, wherein said wheel brake comprises an actuatable plunger aligned with and linearly movable along said swivel axis.

14. The caster wheel brake and anti-swivel system of claim 11, wherein said torque shaft comprises an end portion coupled to said actuation link and an opposite end portion spaced apart from both said actuation link and said swiveling caster wheel assembly, said opposite end configured for coupling to an actuation lever.

15. The caster wheel brake and anti-swivel system of claim 11, further comprising a gear rack disposed along said actuation link and a pinion gear coupled to said torque shaft and intermeshed with said gear rack, wherein said torque shaft and said pinion gear are rotatable together to move said actuation link linearly between the locking and unlocking positions.

16. The caster wheel brake and anti-swivel system of claim 15, further comprising said actuation lever, said actuation lever comprising a foot-actuated lever coupled to said torque shaft, wherein said foot-actuated lever is manually pivotable between braking and non-braking positions corresponding to the locking and unlocking positions of said actuation link.

17. The caster wheel brake and anti-swivel system of claim 11, wherein said brake actuator cam comprises a ramped surface and a horizontal surface at a lower end of said ramped surface, wherein engagement of said wheel brake with said horizontal surface corresponds to said braking position.

18. The caster wheel and anti-swivel system of claim 11, wherein said brake actuator cam and said anti-swivel actuator are both coupled directly to said actuation link and are movable by said actuation link to simultaneously lock said wheel against swiveling about the swivel axis and to lock said wheel against rotation about the rolling axis.

19. The caster wheel brake and anti-swivel system of claim 11, comprising:
   a pair of said caster wheel assemblies;
   a pair of said anti-swivel actuators in spaced arrangement along said actuation link and configured to selectively engage respective ones of said anti-swivel members in response to movement of said actuation link from the unlocking position to the locking position; and
   a pair of said brake actuator cams in spaced arrangement along said actuation link and configured to selectively urge said wheel brakes into said braking positions.

20. The caster wheel brake and anti-swivel system of claim 19, further comprising a pair of brackets mounted between said caster wheel assemblies and the mobile support or storage device, wherein said brackets define respective channels for slidably receiving portions of said actuation link.

* * * * *